(No Model.) 6 Sheets—Sheet 2.

W. J. EDWARDS.
VELOCIPEDE.

No. 475,445. Patented May 24, 1892.

Witnesses
W. Middleton
M. H. Wagner

Inventor
William J. Edwards
By Chas. G. Page
Atty (No Model.) 6 Sheets—Sheet 3.
W. J. EDWARDS.
VELOCIPEDE.

No. 475,445. Patented May 24, 1892.

(No Model.) 6 Sheets—Sheet 5.

W. J. EDWARDS.
VELOCIPEDE.

No. 475,445. Patented May 24, 1892.

Witnesses
W. Middleton
M. M. Wagner

Inventor
William J. Edwards
By Chas. G. Page
Atty (No Model.) 6 Sheets—Sheet 6.

W. J. EDWARDS.
VELOCIPEDE.

No. 475,445. Patented May 24, 1892.

Witnesses.
W. D. Middleton
Margaret M. Wagner

Inventor
William J. Edwards
By Chas. G. Page Atty

UNITED STATES PATENT OFFICE.

WILLIAM J. EDWARDS, OF CHICAGO, ILLINOIS, ASSIGNOR TO THE UNION MANUFACTURING AND PLATING COMPANY, OF SAME PLACE.

VELOCIPEDE.

SPECIFICATION forming part of Letters Patent No. 475,445, dated May 24, 1892.

Application filed November 5, 1891. Serial No. 411,014. (No model.)

*To all whom it may concern:*

Be it known that I, WILLIAM J. EDWARDS, a citizen of the United States, residing at Chicago, in the county of Cook and State of Illinois, have invented a certain new and useful Improvement in Velocipedes, of which the following is a specification.

The more prominent objects of my invention are to protect the sprocket wheel and chain from mud and dirt thrown from the adjacent supporting-wheel; to provide an exceedingly serviceable and effective arrangement of mud-guard and brake-spoon; to permit an automatic disconnection in the brake mechanism in case of an accidental fall on the part of the machine and twist on the part of the steering-head, and thereby avoid injury to the brake mechanism by torsional strain; to simplify and improve the sprocket-axle bearings; to permit the sprocket-axle bearings to be readily removed and replaced; to provide certain improved details in the frame, so as to render the same strong and durable without adding to the weight, and to provide certain further improved details, all serving to increase the general efficiency of velocipedes.

My said invention involves various matters which are applicable to velocipedes generally. Said matters and all remaining features involved are, however, particularly applicable to bicycles, and hence I have herein illustrated and described the same as involved in the construction of a Safety bicycle, it being understood that where serviceable in other forms of velocipedes the same can be so applied.

In the accompanying drawings, Fig. 8 represents the body-frame in perspective. Fig. 9 shows, on a larger scale, one of the side hangers arranged at the point of union of the side members of the frame.

The brake-spoon A (see Figs. 1, 2, and 3) is made concave in cross-section throughout its length, and is arranged as a downward extension or continuation of the mud-guard B for the rear supporting-wheel C, the general effect being a mud-guard arranged over and in front of the wheel and extending below the lowest portions of the sprocket D and driving-chain E, so as to prevent any mud or dirt from being thrown from the wheel onto either the sprocket or the driving-chain, while at the same time I utilize this extension or prolongation of the mud-guard as a brake-spoon or brake, which by operating any suitably-arranged mechanism can be applied to the wheel at the will of the rider. By making the brake-spoon concave in cross-section, as best illustrated in Fig. 2, it will be provided with downwardly-widening sides 1, and will form a guard for the wheel at a point where in machines—such, for example, as the "Columbia"—dirt can be thrown freely from the wheel onto the chain and sprocket regardless of the presence of the brake-spoon, which in said machines is not adapted to shield the sprocket and chain.

The body-frame involves in common with old and well-known constructions of machines the feature of arranging the three members of the frame which converge at or about the pedal-crank axle double or forked through the whole or a portion of their lengths, so as to permit the driving-chain to be mounted on the pedal-crank axle between said members of the frame, as in United States Letters Patent to R. Watsor, No. 363,189, of May 17, 1887, British Letters Patent No. 13,782 of 1886, and many others, it being observed, however, that I do not, as in said United States Letters Patent No. 363,189, connect the lower divided portion of the frame with a steering-post.

The frame F comprises a reach or backbone F', rear triangular frame portions F², united at their upper forward corners with the reach, and a divided lower portion F³, which unites with the lower forward corners of the triangular frame portions F², but which in place of being attached to the steering-post is at its forward end rigidly united with a vertically-arranged tubular frame portion or socket 2, which forms the forward end of the frame and holds the reach F', and also provides a socket-bearing for the steering-post F⁴ to turn in.

The rear portion of the body-frame is divided, being formed by the two triangular frames F², which are arranged, respectively, at opposite sides of the rear wheel, and which are at their lower forward corner portions separated to an extent to provide between them suitable space for the sprocket-wheel and a portion of the brake mechanism, and also separated to an extent to permit the two joints formed at the points of junction between the frame portions F² and the sides 3 of the lower divided frame portion F² to provide supports for the bearings for the sprocket-axle 4 at points outside of the sprocket-wheel, as hereinafter more particularly described. A novel and important feature in this particular construction of body-frame consists in the cross-bar G, arranged as a brace-and-stay connection between the sides 3 of the lower forwardly-arranged divided portion F³ of the body-frame. This combined brace and stay bar is arranged adjacent to and forwardly of the sprocket-wheel D, and not only steadies and strengthens the entire frame, but also prevents a certain wabble found in machines made without it, and also effectively resists any and all tendency of the frame to crush or collapse when violently thrown down upon its side. The bar G is also an auxiliary to the bearings for the sprocket-axle. These bearings, which are supported by hangers or holders I at the junctions of the rods 3 5 6, Fig. 8, of the divided body-frame, must be held rigidly and steadily apart at a fixed distance, and hence said hangers or holders I must be held rigidly apart at a fixed distance, it being observed that such conditions are necessary in order to insure perfectly-true working between the sprocket-axle and its bearings. The foregoing rigidity of connection between the holders for the hangers is attained by the cross-bar G, which resists any and all tendency on the part of the divided frame to either contract or spring apart, and hence true, steady, and accurate working between the sprocket-axle and its bearings will be insured. The cross-bar G may also provide a support for the forward end of a brake-spoon spring, as in my application for Letters Patent of the United States, Serial No. 397,018, filed June 22, 1891, or, as herein illustrated, it can serve as a fulcral support for the brake-lever K, Figs. 1 and 2, which is at one end connected with the brake-spoon by a spring 7 and at its opposite end connected with the brake-spoon by an adjustable connection 8, consisting of a two-part extensible link which can be lengthened or shortened so as to vary the position of the brake-spoon to the wheel—that is to say, set the brake-spoon either farther out from or closer up to the wheel, as may be found desirable. Said link, as shown in Fig. 2, comprises a section which is hinged to the brake-spoon and a section which is hinged to lever K and adjustably held in a socket 9 in said first-mentioned section by a set-screw 10. The bar G has its ends rigidly united with the side rods 3 of the body-frame, and is desirably formed with eyes 11, through which the side rods 3 are arranged to extend, it being understood that the rods 3, 5, and 6 can be either solid or tubular, as may be desired.

Returning now to the brake-spoon (see particularly Figs. 2 and 3) the body-frame is provided with a cross-piece L, which serves to hold both the forward lower end of the mudguard B and the hinged end of the brake-spoon. The cross-piece L assists, as a matter of course, in bracing and staying the divided frame, but is of minor importance for such purpose in comparison with the cross-piece G, owing to the difference in their respective locations and relations to the strain incurred. The cross-piece L is provided with end eyes or sockets 12 for the side rods 5 of the body-frame and crosses the mud-guard B, which has its lower end secured to the flattened middle portion 13 of the cross-piece by a bolt or screw 14. The cross-piece is also provided at its middle portion with a notch 15 and lugs 16, arranged at opposite ends of the notch and adapted to form pintle-bearings for a pintle 17, which extends through a long eye or bearing 18 on the upper end of the brake-spoon A, it being observed that the notch 15 provides space for the pintle eye or bearing 18, as in an ordinary hinge. By such arrangement the cross-plate L covers the line of separation between the lower end of the mud-guard B and upper end of the hinged brake-spoon A, and while assisting in bracing and staying the divided frame affords a simple, convenient, and firm support for the brake-spoon. This arrangement also permits the brake-spoon to be made in a simple and economical way, and simplifies both the manufacture of the same and its application to the machine. The foregoing-described arrangement of parts also permits the devices directly acting upon the brake-spoon to be arranged exactly midway of the space between the two divisions of the body-frame and to have their supports at such middle points, thereby avoiding any tendency to exert diagonal strain on the body-frame.

Figure 1:
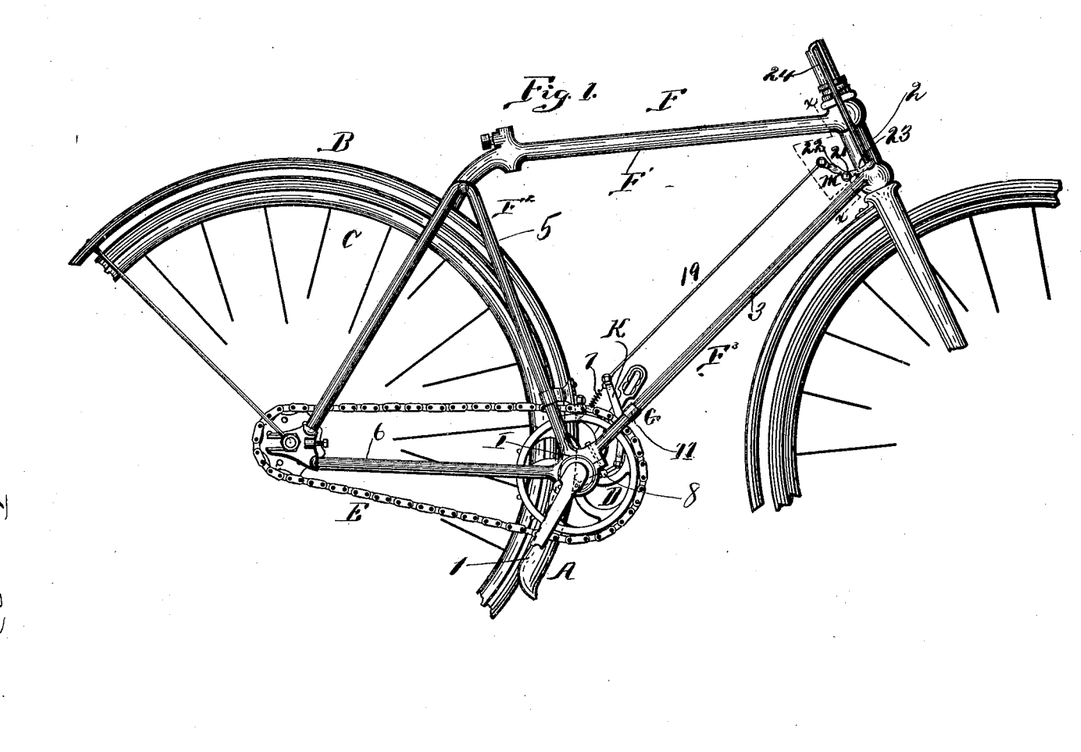
Figure 1 represents, in side elevation, a portion of a Safety bicycle embodying my invention.
Figure 2:
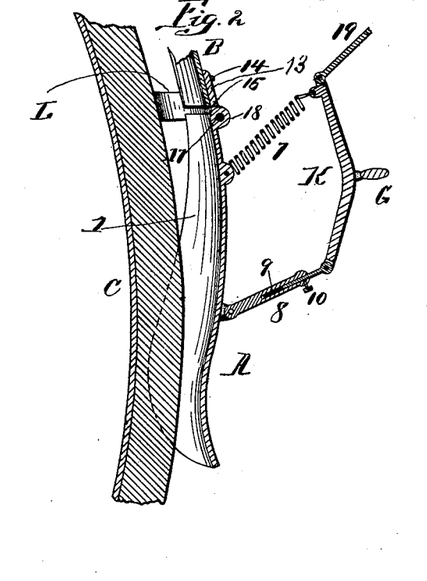
Fig. 2 represents, on a larger scale, a section on a vertical plane through the brake-spoon, a portion of the rear wheel, and a portion of the brake mechanism.
Figures 2, 3:
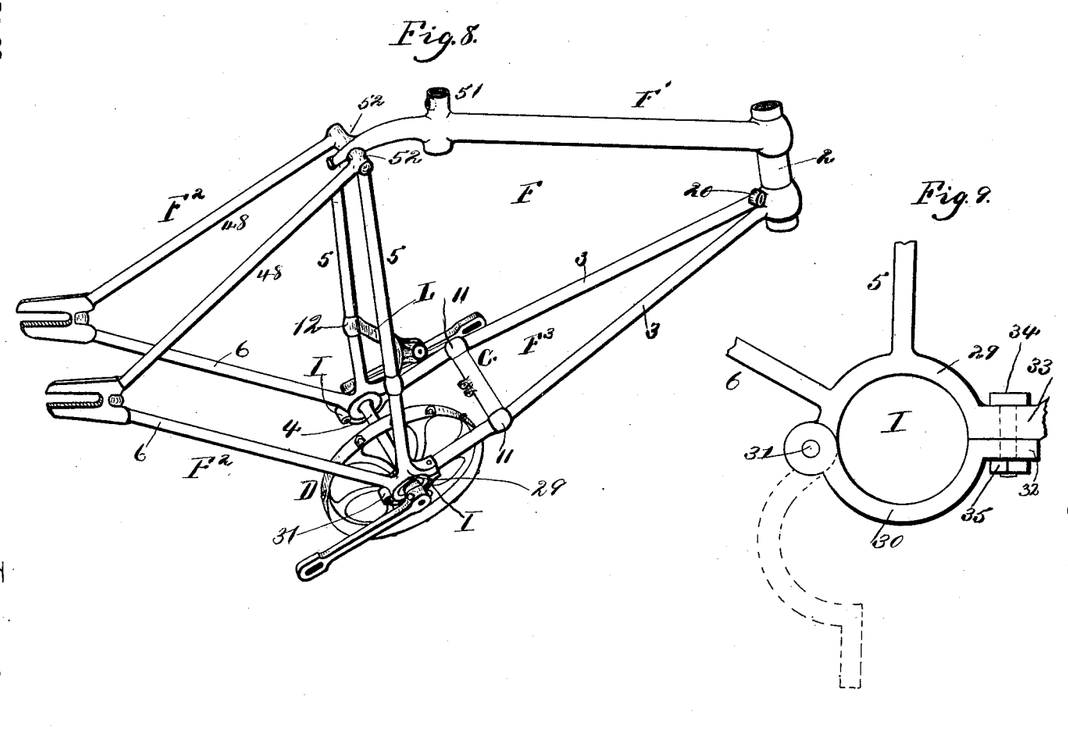
Fig. 3 represents the brake-spoon and a portion of the supporting-frame for the same in front elevation, the remaining portion of the brake mechanism shown in Fig. 2 being omitted.
Figure 3:
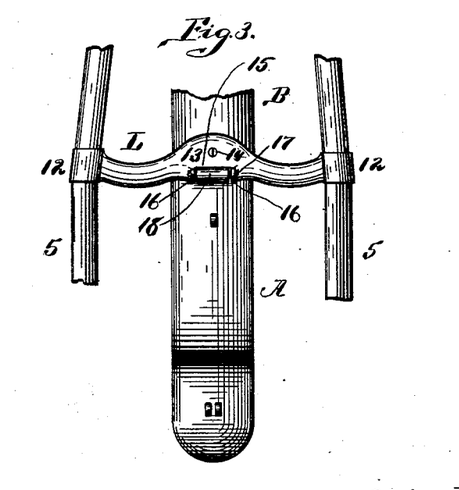
Figures 4, 5, 6, 7:
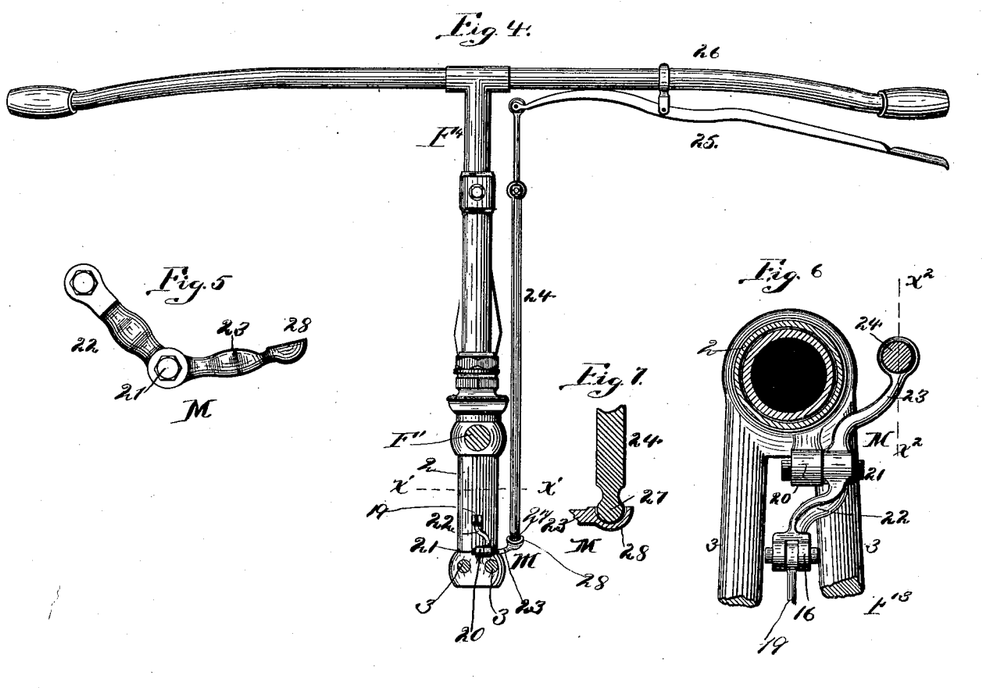
Fig. 4 is a section taken transversely through the body-frame on line $xx$ in Fig. 1, and shows the steering-head, handle-bar, and forward portion of the steering mechanism in elevation, so as to illustrate the detachable connection between the vertical brake-rod and a bell-crank lever on the machine-frame.
Fig. 5 is a side view of said bell-crank on a larger scale.
Fig. 6 represents a section through Fig. 4 on line $x'x'$, on a larger scale, so as to show the bell-crank in top plan view.
Fig. 7 is a section on line $x^2 x^2$ in Fig. 6, and illustrates the separable ball-and-socket connection between the vertical brake-rod and the bell-crank.

The lever K is fulcrumed upon the cross-bar G and operated by a rod or link 19, Figs. 1 and 6, which extends forwardly from the lever K and connects with one of the arms of a double-armed lever or bell-crank M at the front end of the machine. The frame is provided at the point of union between rods 3 and its forwardly-arranged socket portion or head 2 with an eye 20, which serves as a bearing for the pivot 21 of the bell-crank M. The rear arm 22 of this bell-crank is bent laterally toward the middle longitudinal line of the machine, so as to allow the connecting rod or link 19 to lie in said line. The forwardly-extending arm 23 of the bell-crank is bent outwardly, so as to extend to one side of the head or socket portion 2 of the body-frame and place its forward end in proper position to connect with the vertically-arranged brake-rod 24, which stands alongside the steering-head and post and connects at its upper end with the inner end of a brake-lever 25 on one of the handle-bars 26, Fig. 4. As a connection between the rod 24 and bell-crank M, I provide a detachable ball-and-socket connection, the ball 27 being preferably on the rod, Fig. 7, and the socket 28 on the bell-crank. The socket is cup-shaped and receives the ball 27, which is formed by a rounded end of the rod. For all purposes of use the integrity of the ball-and-socket joint will be preserved; but in case the machine should fall over and the handle-bar swing round with the front wheel (which will usually swing round and under) the connection between the rod and bell-crank will automatically sever and thus prevent breakage. Thus if, for example, the machine should fall to the left and the front wheel turn suddenly to the right the handle-bar will swing round independently of the frame to such extent as to draw the rod 24 away from and out of connection with socket 28, it being observed that while the spring 7 will keep the socket in engagement with rod 24 under all ordinary conditions of use the extent of turn or swing on the part of the front wheel in case of the aforesaid-mentioned accident is so great as to draw the rod beyond the limit at which the spring will preserve connection between the rod and socket, and hence in place of a breakage occurring at such point the joint in the brake mechanism will simply separate and thus avoid any and all torsional strain upon such mechanism.

The sprocket-axle is supported by separately-arranged bearings, and these said bearings are respectively supported by one and the other of a couple of hangers or holders I, whereof the construction is best illustrated in Figs. 8 and 9. The body-frame is constructed, as hereinbefore set forth, with a divided portion whereof each side comprises three rods or members 3 5 6, arranged to converge toward one of the hangers. Each hanger or holder consists of a divided ring having its upper fixed half 29 united to a set of said side rods or members 3 5 6 by brazing or the like, so as to be permanently rigid with the same, and a lower movable half 30, hinged at one end, as at 31, to the upper half, and having its opposite end extended outwardly to form a jaw 32, which can be secured to a like portion 33, formed by an extension of one end of the upper half of the annular hanger or holder by a bolt 34 and nut 35. By such arrangement the bearings can be arranged within and clamped by the hangers or holders I, which latter can be opened preparatory to introducing or removing said bearings, as indicated in dotted lines in Fig. 9, wherein the lower half of one of the hangers is shown unfastened and allowed to swing down. By such arrangement a simple and light construction of hangers or holders for the sprocket-axle bearings is provided, it being seen that the body-frame is constructed with a divided portion, whereof each division comprises a set of solid or tubular side rods 3 5 6, which converge toward and are rigidly and permanently united by a half-ring 29, to which is hinged the half-ring 30, in order that a bearing for the sprocket-axle can be clamped between the two. It will also be seen that the upper half-ring or semicircular upper portion 29 of each holder or hanger forms an arch-shaped piece, to which the three bars or members 3, 5, and 6 of its allotted side of the longitudinally-divided frame are rigidly and permanently united, and that by movably applying the lower half-ring or lower semicircular portion 30 of the hanger to said upper portion 29 of the same the hanger can be opened without disturbing the connection of said part 29, which preserves its integrity as an arch-shaped connection between the three frame members 3, 5, and 6, which practically radiate from the middle and two end portions of the part-circular piece.

The bearings for the sprocket-axle are each constructed with an internally-threaded ring or sleeve 36, (see Figs. 13 to 16,) into which is screwed from opposite sides a couple of bearing-caps H, each formed with an externally-threaded cylindric portion 37, having at its inner end an annular obliquely-arranged flange 38 and at its outer end an annular flange 39.

The inclined or oblique flanges 38 at the inner ends of the cylindric bearing-caps provide an outer two-part annular bearing-face for a set of anti-friction balls 40, for which an inner annular bearing-face 41 is provided by grooving an enlarged portion 42 of the axle. This enlarged portion of the axle is also provided with a couple of annular grooves 43, respectively, at opposite sides of the groove 41, and each serving to hold a ring 44, of paraffine or other material—such as felt or the like, adapted to receive the edge portion of one of the annular flanges 38. The flanged ring or bearing-caps H are secured into the internally-threaded sleeve 36, and are provided at their outer ends with annular flanges 39, which serve as guards. The internally-threaded sleeve 36 is provided with an opening 46, through which the anti-friction balls can be passed to their allotted track. Thus when the ring-caps H are screwed only part way into sleeve 36, so as to leave hole 46 therein open, the balls can be introduced by way of said hole into the annular space between the axle, flanges 38, and portion of sleeve 36 between the inner ends of the ring-caps, after which the ring caps can be screwed up so as to cover the hole 46 and hence confine the balls within an annular space formed between the axle and the sloping flanges 38.

The foregoing arrangement renders the application and removal of one or more of anti-friction balls an easy and convenient matter. The sleeve 36 is split or divided at points suitable for rendering it elastic and capable of compression upon the ring caps or bearings H, so as to hold the latter against turning, and to such end the sleeve is provided with slots or notches 47, which extend from its edge portions transversely and part way only across the sleeve and which serve to split or divide it at points suitable for the purpose aforesaid. The hangers or holders I are adapted to encircle and clamp the sleeves 36, and by tightening up nuts 35 on the bolts which are applied to the holders I the latter can be clamped upon the elastic sleeves 36, so as to clamp the latter upon their respectively-allotted pairs of caps or bearings H, and hence prevent the latter from turning.

As a matter of further improvement, the sleeve 36 is reduced in thickness between its edge portions, in which way it is provided with a comparatively thin annular middle portion 36$^a$ and with thickened-up annular edge portions 36$^b$, through which the short transversely-arranged slits are formed, it being observed that the sleeve is thus thickened up along its perimeter, so as to permit it to have a straight cylindric threaded bore. This construction permits the hanger to clamp upon the thickened edge portions 36$^b$ only of the sleeve, and thereby leaves the unslitted middle portion of the sleeve free to act as a spring. When, therefore, the sleeve is clamped within the hanger, its slitted edge portions will be slightly bent down upon the two members of the two-part bearing, and since these edge portions are comparatively thick they will withstand the pressure, while at the same time the entire unslitted annular portion of the sleeve will be left as a spring-body common to the edge portions between the slits, thereby providing a highly-elastic sleeve and at the same time avoiding breakage.

Figure 10:
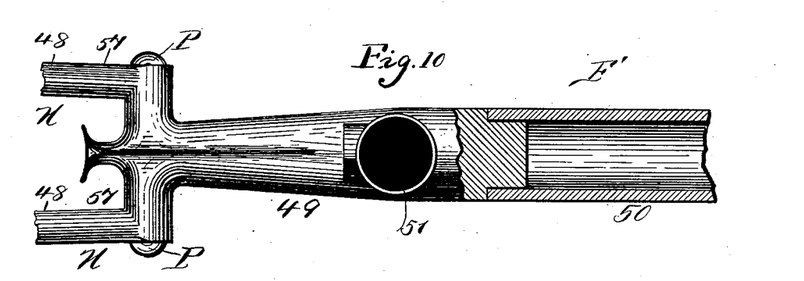
Figs. 10, 11, and 12 show, on a larger scale than Fig. 8, the upper middle portion of the reach, said figures being, respectively, a top plan partly in longitudinal central section, a longitudinal central section on an approximately horizontal plane, and a side elevation.
Figure 17:
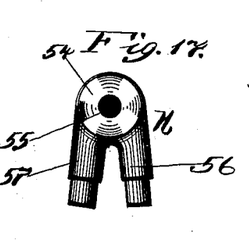
Figs. 17 and 18 show in different positions one of the double-armed joint-pieces shown in section in Fig. 11.
Figure 18:
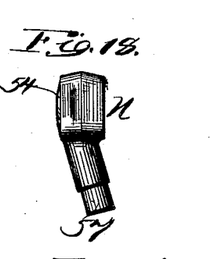

The reach or upper portion of the body-frame (see particularly Figs. 10, 11, and 12) comprises a single backbone portion F', which is at its rear end united with a divided frame portion formed by the rods 5 5 and 48 48 of the frame portions F$^2$. The backbone F' comprises a solid metal portion 49, to one end of which is secured the tubular portion 50. The solid metal portion 49 is provided at a point between its ends with a socket 51 for a seat-standard, and is at its rear end formed with a couple of short laterally-projecting arms 52. Each of said arms or lateral projections 52 has its end formed with a conical recess or seat 53, which receives the conical side portion 54 (see, also, Figs. 17 and 18) of a double-armed or pronged coupling-piece N. These double armed or pronged coupling-pieces are applied as in Fig. 11 and an internally-threaded sleeve 55 extended through the two couplings N and the laterally-extended end portion of the backbone portion 49, so as to pass through both of the arms 52 thereof. The parts thus arranged are brazed together, with pins P inserted into the tube 55, it being understood that at each side of the double or divided body frame portion a tube 5 and a tube 48 are secured, respectively, to one and the other of the two arms or prongs 56 and 57 of one of the couplings N.

Figure 11:
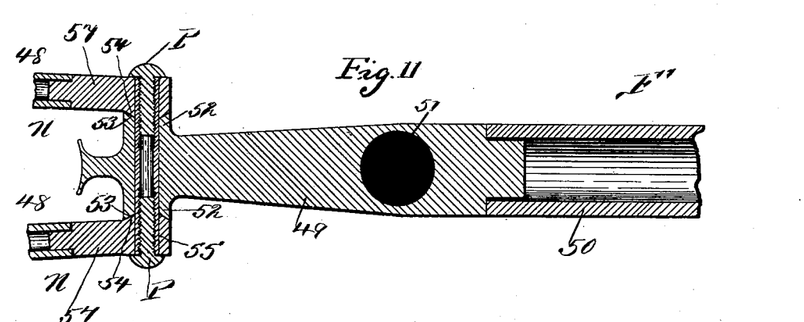
Figure 12:
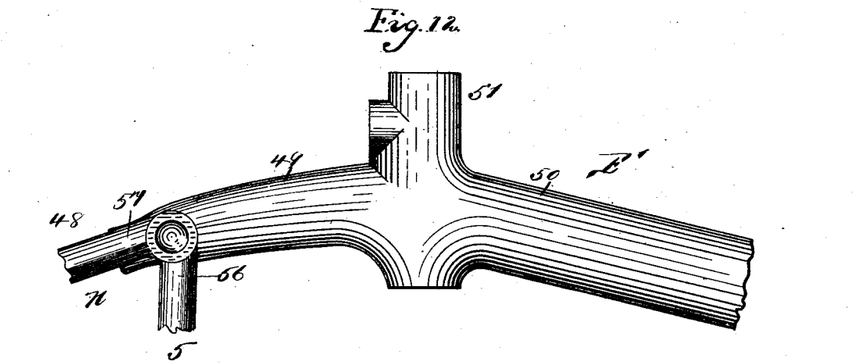
Figure 13:
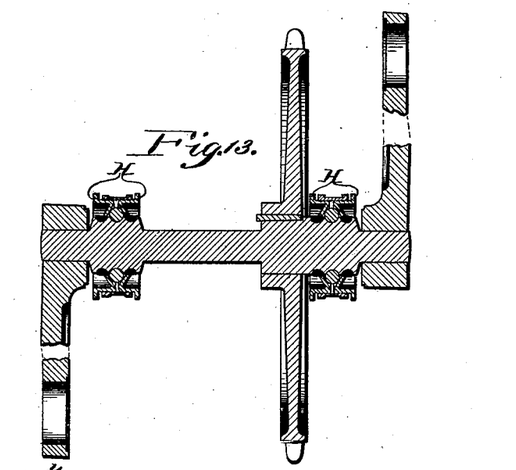
Fig. 13 is a section on a vertical central plane taken longitudinally through the sprocket-axle and sprocket and bearings for the sprocket-axle.
Figures 14, 15:
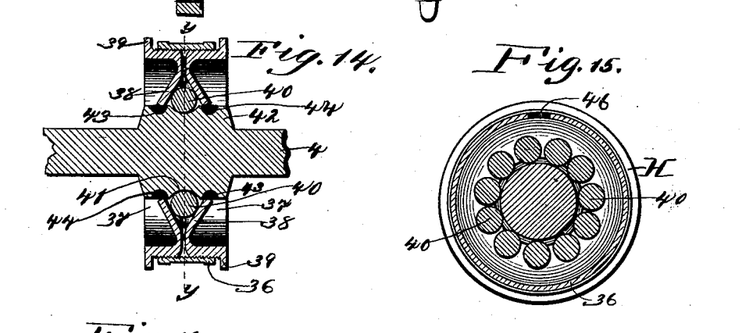
Fig. 14 is a like section through a portion of the sprocket-axle and one of the bearings on a larger scale than in Fig. 13.
Fig. 15 is a section through one of the sprocket-axle bearings on line $yy$ in Fig. 14.
Figure 16:
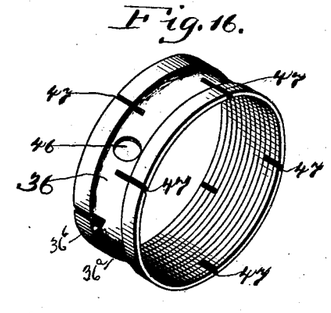
Fig. 16 represents in perspective a portion of one of the sprocket-axle bearings.

The pins P are shown threaded, but will be securely held in place by the operation of brazing, whether threaded or otherwise.

What I claim as my invention is—

1. In a longitudinally-divided bicycle-frame such as set forth, the two-part hangers for the sprocket-axle bearings, each comprising an upper semicircular portion 29, forming a direct and permanently rigid arch-shaped connection between the forwardly and upwardly extending main side members 3, 5, and 6 of a side of the frame and to such end united at one of its ends with one of the lower forwardly-extending side members 3 and at its middle and opposite end portions, respectively, united with one of the upwardly-extending middle members 5 and with one of the rearwardly-extending members 6, and a lower semicircular portion movably applied to the upper semicircular portion of the hanger, so as to permit the same to be opened, substantially as and for the purpose described.

2. In a longitudinally-divided bicycle-frame such as set forth, a two-part hanger I for one of the sprocket-axle bearings, comprising the upper semicircular portion 29, having an extended end portion 33 and forming a direct and rigid arch-shaped connection between the forwardly, rearwardly, and upwardly extending side members 3, 5, and 6 of one side of the frame and to such end directly united at its extended end portion 33 with the side member 3 and at its middle and opposite end portions united, respectively, with the side members 5 and 6, and the lower semicircular portion 30, hinged at one end to one end of the semicircular upper portion of the hanger and at its opposite end bolted to the under side of the end extension of said upper semicircular portion which unites with the frame member 3, substantially as and for the purpose described.

3. The combination, with a set of anti-friction balls arranged about a velocipede-axle and an outer externally-threaded two-part bearing for the anti-friction balls, of an internally-threaded elastic sleeve 36, into which the parts of the bearing are screwed, said sleeve being provided with and rendered elastic by reason of a series of transversely-arranged slits 47, extending from its edge portions part way only across the sleeve, and a hanger within which the sleeve is clamped, substantially as and for the purpose described.

4. The combination of the axle provided with an annular groove and a two-part bearing providing about the axle an annular divided bearing-surface surrounding the groove in the axle and adapted for a set of anti-friction balls arranged in said groove, and a sleeve into which the divisions of the two-part bearing are screwed, said sleeve being provided with an opening 46, through which the balls can pass when the divisions of the two-part bearing are separated for such purpose, but still held within the sleeve, substantially as described.

5. In a velocipede, the hinged brake-spoon A, constructed and arranged to form a continuation of the mud-guard B and to shield the sprocket wheel and chain, substantially as set forth.

6. The combination, with the hinged brake-spoon A, of the lever K, fulcrumed upon a cross-bar G in the body-frame and connected with the hinged brake-spoon, substantially as set forth.

7. The combination, with the hinged brake-spoon A, of the lever K, spring 7, connecting one end of the lever with the brake-spoon, and an adjustable link forming a connection between the brake-spoon and the other end of said lever, substantially as described.

8. The mud-guard B, arranged over wheel C and between the two frame portions $F^2$ of the body-frame, and a cross bar or plate L, secured to the lower forward end of the mud-guard and supported by the rods 5 of said frame portions, substantially as set forth.

9. The combination, with the mud-guard B, of the plate L, secured to the lower forward end of the mud-guard and held by rods 5 of the body-frame, and the brake-spoon A, hinged to said plate, substantially as set forth.

10. In a brake-operating mechanism having points of support upon the handle-bar and body-frame, an automatically-separable joint arranged to part of its own accord when the handle-bar is swung round to an undue extent, substantially as set forth.

11. The combination of the lever M, supported on the body-frame, and a connecting-rod connected with a hand-lever upon the steering-handle and having an automatically-separable connection with the lever M, arranged so as to part of its own accord when the handle-bar is swung round to an undue extent, substantially as described.

12. The combination, with the rear wheel C, of the hinged brake-spoon A, the lever K, connected with the brake-spoon, the lever M, connected with the lever K by a rod 19, a hand-lever 25 on the steering-handle, and rod 24, connecting said hand-lever with the lever M, substantially as set forth.

13. The portion 49 of the backbone, provided with laterally-projecting arms 52, combined with the triangular frame portions $F^2$, having their upper forward corner portions formed by the couplings N, secured against the ends of said arms of the backbone, substantially as described.

14. The rear portion of the backbone, combined with frame portions $F^2$, having their upper forward corners formed by couplings N, a tube 55, extending through said couplings and rear end of said rear portion of the backbone, and screws P, engaging in the ends of said tube, substantially as set forth.

15. The backbone having its rear end portion provided with seats 53 and a transversely-arranged bore, the frame portions F, having their forward upper corners formed by couplings N, provided with portions 54, fitted to seats 53, and a tube 55, extending through the couplings and the said bore in the backbone, substantially as described.

16. The combination, in a velocipede, of an outer bearing for the anti-friction balls, an internally-threaded sleeve receiving and engaging with said bearing and having a reduced middle portion $36^a$ and thickened slitted edge portions $36^b$, and a hanger or clamp within which the sleeve is held and which bears upon said thickened slitted edge portions of the sleeve, substantially as and for the purpose described.

WILLIAM J. EDWARDS.

Witnesses:
W. D. MIDDLETON,
CHAS. G. PAGE.